United States Patent Office 2,943,486
Patented July 5, 1960

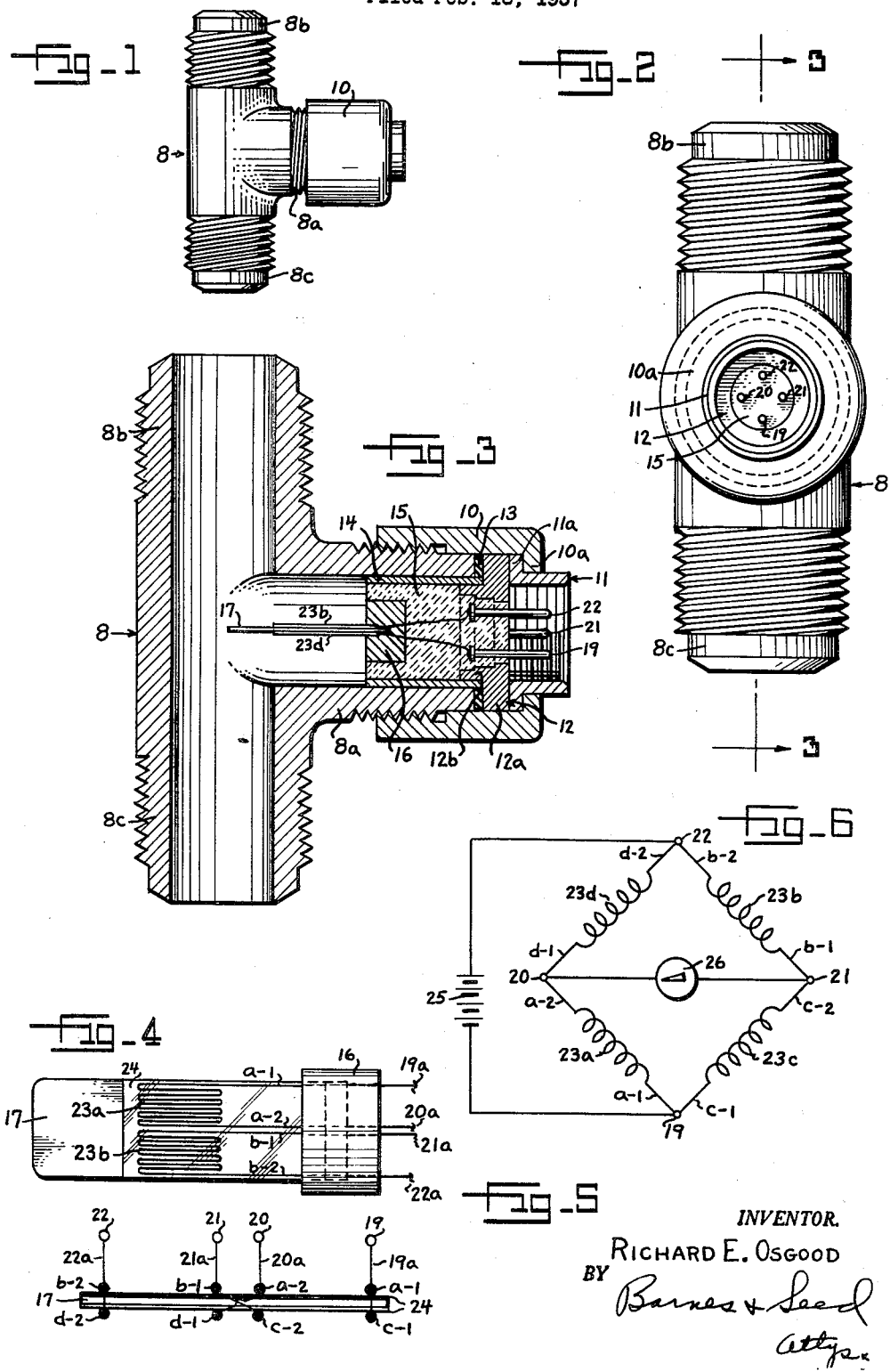

2,943,486

HIGH RESPONSE FLOW-METER

Richard E. Osgood, 2818 208th SW., Edmonds, Wash.

Filed Feb. 18, 1957, Ser. No. 640,949

3 Claims. (Cl. 73—228)

The present invention relates to an improved high response flow-meter operating generally on the principle of the orifice type meters wherein a differential pressure is measured across a restriction, but differing therefrom in that the differential pressure sensing unit is also the orifice restriction.

My invention aims to provide a flow-meter which can accurately record transient or static reversals of flow, detect cavitation or voids in a hydraulic system, drive an oscillograph, oscilloscope function plotter, milliameter or millivoltmeter directly with only a direct current power source necessary for a customary strain gauge excitation signal, and does not require amplifiers or other relatively expensive and complicated equipment.

With the foregoing and other more particular objects and advantages in view, and which will each appear and be understood in the course of the following description and claims, the invention consists in the novel construction and in the adaptation and combination of parts hereinafter described and claimed.

In the accompanying drawing:

Figure 1 is a plan view of my flow-meter.

Fig. 2 is a side elevational view of the flow-meter to a more enlarged scale.

Fig. 3 is a sectional view taken as indicated by the line 3—3 of Fig. 2.

Fig. 4 is a plan view of the reed assembly still further enlarged.

Fig. 5 is a schematical view of part of the wiring circuit looking toward the root end of the reed from the terminals; and Fig. 6 is a schematic of the Wheatstone bridge circuit.

Referring to the drawings it is seen that a tubular T-fitting 8 is provided having its leg denoted 8a and its upstream and downstream arms designated by 8b and 8c, respectively. These arms and leg are externally threaded for insertion into a flow system in the former instance and to receive a nut 10 in the latter case. It will be noted that the nut has an inner annular hold-down flange 10a which bears directly against an out-turned flange 11a of an internally threaded plug adapter 11. This adapter flange in turn presses against the base of an internally stepped terminal housing 12 which is necked to provide a mounting flange 12a and a neck 12b. A copper-asbestos gasket 13 is clamped between the mounting flange 12a and the free end of the tubular leg 8a.

Mating with the neck 12b of the terminal housing and fitting into the leg 8a is a core sleeve 14. This sleeve receives a ceramic core 15 serving to anchor the ceramic base 16 of a reed assembly whose reed is designated 17.

The potting for the core 15 is poured into the housing 12 as well as the sleeve to anchor four plug terminals 19–22 and to electrically insulate the latter along with their leads 19a, 20a, etc. These leads extend from two pairs of strain gauge units 23a–d mounted on opposite sides of the reed 17 in longitudinal relation thereto, units 23a, 23b being side-by-side in the upstream side and units 23c, 23d being respectively therebeneath on the downstream side.

Each of the strain gauge units can be of the general type disclosed in United States Patent No. 2,390,038. In this type of gauge a fine strain-responsive wire filament of about one mil in diameter is formed into several parallel passes and has its ends soldered or otherwise connected to heavier gauged leads. The filament is initially bonded to a flexible membrane such as paper which, in turn, is bonded to the member whose strain is to be measured, and namely the reed 17 in the present instance. The paper membrane is numbered 24.

For clarity it will be noticed that the lead portions of the four strain gauge units have been distinguished by the letter suffix of the corresponding unit followed by alternating numerical suffices; for example, unit 23a has leads a–1 and a–2. As indicated in Fig. 5, leads a–1 and c–1 are connected to terminal lead 19a, leads a–2 and d–1 to lead 20a, leads b–1 and c–2 to lead 21a, and leads b–2 and d–2 are connected to terminal lead 22a. In this manner, as shown in Fig. 6, a Wheatstone bridge is formed which can be readily activated merely by wiring the socket (not shown) for the plug such that terminal prongs 19, 22 will be connected to a battery 25 and prongs 20, 21 to an oscillograph or any other suitable indicating or recording device 26. There are no temperature compensating problems because all of the legs of the bridge are subjected to the same temperature conditions.

The reed 17 is preferably formed of spring steel such as is commonly used for feeler gauges and may have a thickness of about ten mils. After the strain gauge units have been cemented thereto it has been found convenient to pour the base 16 to encase the connections between the four terminal leads and the eight strain gauge leads as a step preliminary to anchoring the reed 17 relative to the core sleeve and terminal housing assembly by pouring the core 15. However, it should be understood that the base 16 can be omitted and the reed anchored by a single potting operation.

As shown in Fig. 3, the reed 17 cantilevers beyond the strain gauge units far enough into the fluid path defined by the tube arms 8b–c to cause a flow restriction. As a result of this flow restriction, pressure is increased on the upstream side of the reed and decreased on the downstream side causing the reed to deflect in the downstream direction. This deflection places the strain gauges 23a and 23b on the upstream side of the reed in tension and the other two gauges 23c and 23d on the downstream side in compression. The resulting increased resistance of the upstream gauges and decreased resistance of the downstream gauge unbalances the Wheatstone bridge an amount which is proportional to the differential pressure across the reed, and hence is proportional to the fluid flow in the system taken to the second power. Since the pressure sensing unit is also the flow restriction, only a very small pressure drop is required for satisfactory operation. Fow-meters constructed in accordance with my invention have been put into service which will record fluid flows up to 20 g.p.m. at speeds from static condition up to 300 cycles per second with a reed having a natural frequency in air of approximately 500 cycles per second. Many other ranges are possible.

It will be appreciated that heretofore I have used the terms "upstream'" and "downstream" for purposes of example only since my flow-meter will measure flows as well in either direction and in fact, can accurately record static or transient reversals of flow. The amount of flow restriction for a given reed can be easily varied by changing the thickness of the gasket 13.

It is thought that the invention will have been clearly understood from the foregoing detailed description. Minor changes will suggest themselves and may be resorted to without departing from the spirit of the invention, wherefore it is my intention that no limitations be implied and that the hereto annexed claims be given a scope fully commensurate with the boardest interpretation to which the employed language admits.

What I claim, is:

1. In a flow-meter, a generally T-shaped tubular body having two open-ended arms serving as a flow path intersected by the center leg of the body, a plug assembly shouldering against the free end of said leg and having a core of an electrically insulating material fitting within the latter, said plug assembly presenting four externally exposed terminals, cantilevered flow sensing means anchored at its root end within said core and projecting by its free end into flow restricting position within said flow path, two pairs of strain gauge elements on said sensing means with one pair being on the upstream side of the sensing means and the other pair being on the downstream side thereof, and leads within said core electrically connecting said strain gauge elements to said terminals in a Wheatstone bidge arangement.

2. In a flow-meter, a generally T-shaped tubular body having two open-ended arms serving as a flow path intersected by the center leg of the body, a plug assembly shouldering against the free end of said leg and having a core of an electrically insulating material fitting within the latter, said plug assembly presenting four externally exposed terminals anchored within said core, a cantilevered flat reed anchored at its root end within said core and projecting by its free end into flow restricting position within said flow path with the opposite flat sides of the reed facing upstream and downstream, two pairs of strain gauge elements mounted one pair on each of said flat sides so as to respond oppositely to deflection of the reed caused by the pressure differential between its upstream and downstream sides resulting from the reed's flow restriction, leads within said core electrically connecting said strain gauge elements to said terminals in a Wheatstone bridge arrangement with the elements of each said pair being on opposite sides of the bridge, a hold-down nut threadably received by said leg and shouldering against said plug assembly, and a gasket gripped between said plug assembly and said leg.

3. In a flow-meter, a generally T-shaped tubular body having its two arms serving as a flow path intersected by the leg of the body, a core of electrically insulating material in said leg, a cantilevered reed anchored within said core with its longitudinal side edges defining a plane which is perpendicular to said flow path, means for sealing the free end of said leg, said reed projecting by its free end into flow restricting position within said path and adapted to deflect responsive to the pressure differential between its upstream and downstream sides resulting from the flow restriction, electrical strain gauge means mounted on said reed and arranged to respond to deflection thereof, and, electrical conducting means connected to said strain gauge means and extending through said core and terminating externally of said core in isolation to said flow path.

References Cited in the file of this patent

UNITED STATES PATENTS

| | | |
|---|---|---|
| 2,082,539 | Fischer | June 1, 1937 |
| 2,543,020 | Hess | Feb. 27, 1951 |
| 2,683,369 | Brewer | July 13, 1954 |
| 2,742,784 | Brous | Apr. 24, 1956 |
| 2,805,574 | Jackson et al. | Sept. 10, 1957 |

FOREIGN PATENTS

| | | |
|---|---|---|
| 613,478 | Great Britain | Nov. 29, 1948 |